United States Patent

[11] 3,629,649

[72] Inventor Giorgio Del Zotto
Milan, Italy
[21] Appl. No. 879,461
[22] Filed Nov. 24, 1969
[45] Patented Dec. 21, 1971
[73] Assignee Ates Componenti Elettronici S.p.A.
Milan, Italy
[32] Priority Nov. 26, 1968
[33] Italy
[31] 24164A

[54] THRESHOLD DETECTOR FOR INCIDENT RADIATION

10 Claims, 1 Drawing Fig.

[52] U.S. Cl. .......... 315/159, 250/210, 307/310, 315/77, 317/124
[51] Int. Cl. .......... H01j 39/12
[50] Field of Search .......... 315/159, 77, 82, 83; 250/206, 210; 317/124; 307/310

[56] References Cited

UNITED STATES PATENTS

| | | | |
|---|---|---|---|
| 2,759,124 | 8/1956 | Willis, Jr. | 317/124 X |
| 2,963,656 | 12/1960 | Parris | 307/310 X |
| 3,273,012 | 9/1966 | Rosenblum | 315/159 X |
| 3,393,604 | 7/1968 | Lundin | 317/124 X |
| 3,421,009 | 1/1969 | Caruthers | 307/310 X |
| 3,430,076 | 2/1969 | Overtveld | 307/310 X |
| 3,458,770 | 7/1969 | Denger | 315/159 X |
| 3,492,508 | 1/1970 | Wagener et al. | 307/310 X |
| 3,530,378 | 9/1970 | Holle et al. | 250/210 X |

*Primary Examiner*—Roy Lake
*Assistant Examiner*—Palmer C. Demeo
*Attorney*—Karl F. Ross

ABSTRACT: A resistance bridge, having one diagonal connected across a source of direct current, includes in its other diagonal a photodiode in series with the base/emitter circuits of two transistors of opposite conductivity types. One of these transistors controls a further two-transistor stage for operating a relay when the photodiode is illuminated; an armature of that relay exerts a latching or toggle effect by modifying the bias of two of the transistors to vary the sensitivity of the detector in a sense tending to maintain the relay in either its operated or its unoperated state.

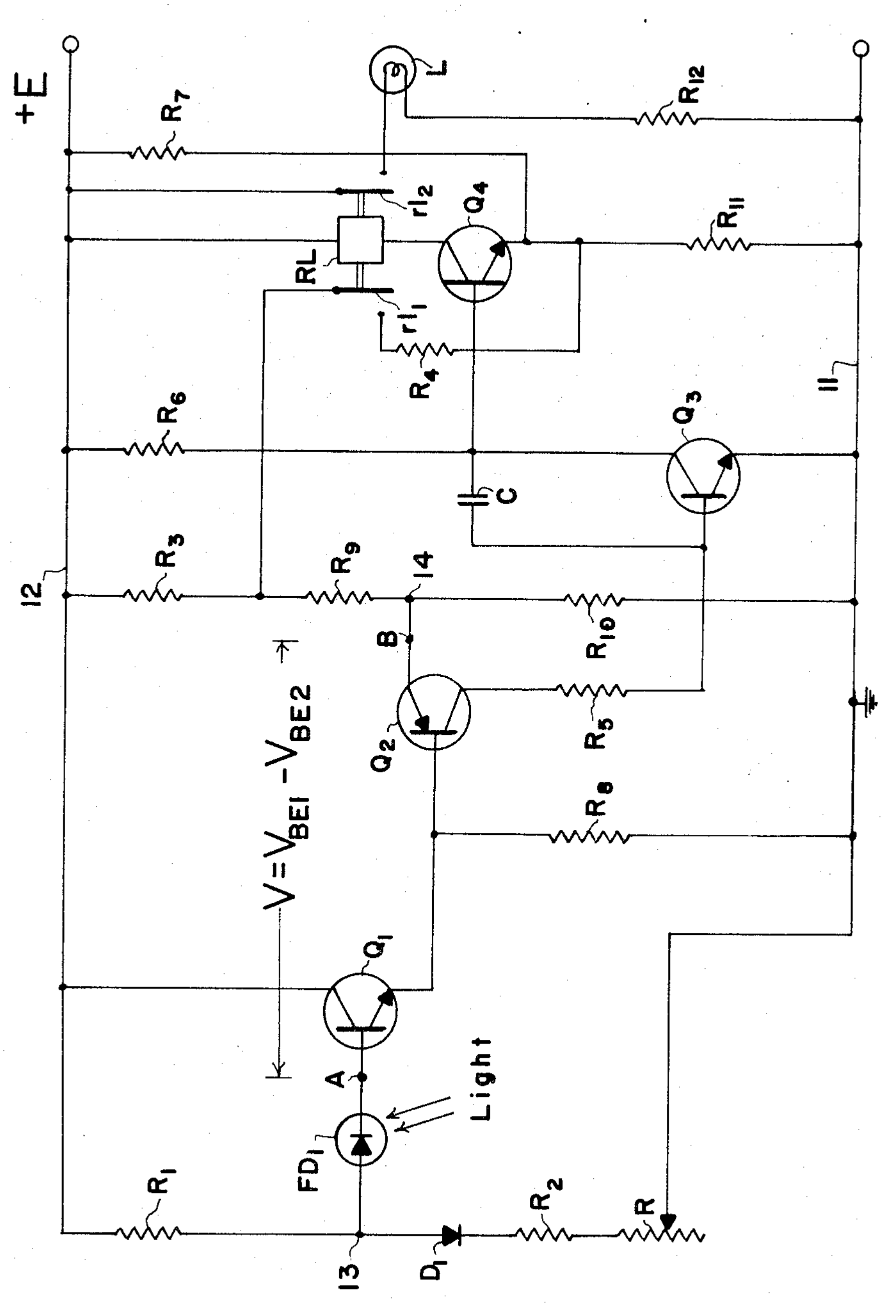
Giorgio DEL ZOTTO
INVENTOR.
BY Karl F. Ross
Attorney

THRESHOLD DETECTOR FOR INCIDENT RADIATION

My present invention relates to a circuit arrangement for detecting ambient light or other incident radiation in order to operate a load in response to a predetermined change in the intensity of that radiation.

Such a system has utility, for example, in connection with a light or set of lights to be turned on automatically at dusk and to be switched off automatically at dawn. Typical for such field of application are the courtesy lights of an automotive vehicle in jurisdictions requiring the illumination of the contours of an automobile parked in the street. Other instances are porch lights and indoor illumination of dwellings whose owners wish to create the impression of night time occupancy.

The use of a radiation-sensitive resistance element, such as a photodiode, readily suggests itself for this purpose. One disadvantage of conventional circuitry using photodiodes is their thermal sensitivity which causes variations in their luminous threshold with changes in ambient temperature. Such thermal sensitivity also manifests itself with similar disadvantageous effect in transistors used to amplify the photodiode output.

An object of my present invention, therefore, is to provide an improved radiation detector of the character referred which is substantially insensitive to variations in ambient temperature.

The conductivity of photodiodes as well as transistors is also affected by changes in the supply voltage. When the power supply is the battery of an automotive vehicle, for example, the supply voltage may vary considerably from one day to the next. Thus, another object of my invention is to provide a radiation detector of this description which is substantially insensitive to moderate fluctuations in the supply voltage.

In view of the relatively high resistance of commercially available photodiodes, they can be directly connected across the input circuit of an associated amplifier only if the resistance of that circuit is comparably high. Since the input resistance of conventional transistors is relatively low, my invention further aims at providing a circuit arrangement facilitating the control of a transistor by a photodiode.

Still another object of my invention is to provide a system wherein the effective response threshold of a photodiode or equivalent radiation-sensitive element can be modified so as to be different for the cut-in and the cutout, thereby creating a toggle effect which prevents any untimely switching of the load by minor variations in the level of incident radiation e.g., illumination of the sensor by the beam of a passing vehicle at night).

These objects are realized, pursuant to my present invention, by the provision of a resistive bridge network having one diagonal connected across a direct-current source and including in its other diagonal the base/emitter circuits of two transistors of opposite conductivity types, i.e., an NPN-transistor and a PNP-transistor; these two input circuits are connected in bucking relationship so that any thermally induced increments of their input resistances substantially cancel each other. Also connected in this diagonal is the radiation-sensitive element or sensor referred to above, this sensor lying in series with the base/emitter circuit of one of these transistors between the latter and a proximal bridge terminal. The collector circuit of this transistor includes a resistor which is common to both base/emitter circuits and extends from their junction to one of the supply terminals (e.g., ground). The second transistor included in this bridge network has its collector connected in series with an input circuit of a transistorized amplifier preferably comprising two transistor stages whose conductivity type is the same as that of the first transistor (e.g., NPN). The load circuit includes a relay serving for the alternate energization and deenergization of a controlled device (e.g., a lamp) in response to variations in the level of radiation incident upon the sensor.

Advantageously, in accordance with another feature of my invention, the relay controls a switch for modifying the bias of one or more transistors forming part of the bridge network and/or the associated amplifier for the purpose of feeding back a signal tending to stabilize the relay in its operated or unoperated condition. Owing to the resulting latching or toggle effect, the control circuit for the relay responds to different threshold levels of the sensor output in switching from one operating condition to the other.

Another feature of my invention resides in the provision of an impedance element of substantially the same thermal coefficient of resistance as the radiation sensor, e.g., a germanium diode, connected in an arm of the bridge as part of a temperature-compensating circuit which extends from the aforementioned bridge terminal through the common resistor to the junction of the two base/emitter circuits.

Since the voltage difference developed across the output diagonal of the bridge is a small fraction of the supply voltage, fluctuations in the latter voltage if the bridge is nearly balanced have only a negligible effect upon the energization of the two mutually opposed transistor inputs. A photodiode used as the temperature sensor is therefore traversed by only a small current so that the transistor input resistance, as seen from that photodiode, is high.

The invention will be described in greater detail hereinafter with reference to the accompanying drawing;

the sole FIGURE of which shows a circuit diagram of a representative embodiment.

The system shown in the drawing comprises a pair of bus bars 11, 12 connected across a source of direct current, such as an automotive battery, having a grounded negative terminal tied to bus bar 11 and a positive terminal of potential $+E$ tied to bus bar 12. A bridge network connected between these bus bars is formed by a resistor $R_1$ connected between bus bar 12 and a terminal 13, another resistor $R_2$ connected in series with part of a potentiometer R between terminal 13 and bus bar 11, a further resistor $R_{10}$ between this bus bar and a terminal 14, and two series resistors $R_3$, $R_9$ between terminal 14 and bus bar 12 as indicated above, the bridge is in a condition of near balance so that the voltage difference developed across its output diagonal 13–14 is a small fraction of the supply voltage E impressed upon its input diagonal 11–12.

A first transistor $Q_1$, of the NPN type, has its base connected through a photodiode $FD_1$ to terminal 13, its collector being directly tied to bus bar 12 while its emitter is grounded through a resistor $R_8$. A second transistor $Q_2$, of the PNP type, has its base grounded through the same resistor $R_8$ and its emitter directly connected to terminal 14; the collector of transistor $Q_2$ is connected to grounded bus bar 11 through a resistor $R_5$ and the base/emitter circuit of a further transistor $Q_3$ constituting the first stage of a two-stage amplifier whose second stage comprises a transistor $Q_4$ having its base connected to the collector of transistor $Q_3$; this collector is energized from bus bar 12 through a resistor $R_6$ and is capacitively coupled to its base through a condenser C. The emitter of transistor $Q_4$ is connected to the junction of two resistors $R_7$, $R_{11}$ forming a voltage divider connected across bus bars 11, 12. This voltage divider has another branch, in parallel with resistor $R_7$, consisting of a further resistor $R_4$ in series with resistor $R_3$. The connection between resistors $R_3$ and $R_4$ includes an armature $rl_1$ of a relay RL, here assumed to be of the electromagnetic type, whose winding is connected between bus bar 12 and the collector of transistor $Q_4$. Another armature $rl_2$ of relay RL is connected in series with a load here shown as a lamp L and an associated ballast resistor $R_{12}$.

A germanium diode $D_1$ is connected in series with resistor $R_2$ and potentiometer R in a temperature-compensating circuit which includes the resistor $R_8$ common to the inputs of transistors $Q_1$ and $Q_2$. Owing to the bucking relationship of the base/emitter circuits of these transistors, the voltage developed between the base of transistor $Q_1$ (point A) and the emitter of transistor $Q_2$ (point B coinciding with terminal 14) equals the difference $V_{BE1}-V_{BE2}$ between the base/emitter voltages of transistors $Q_1$ and $Q_2$. If the two transistors $Q_1$ and $Q_2$ have substantially the same thermal coefficient of resistance, the effect of any change in ambient temperature upon the conductivity of one transistor will be approximately canceled by the corresponding effect upon the other transistor.

Similarly, with the temperature coefficient of resistance of diode $D_1$ and photoelectric sensor $FD_1$ approximately equal, and with these two elements having corresponding electrodes (i.e., their anodes) connected to the same terminal 13, any increment in the resistance of photodiode $FD_1$ due to a change in ambient temperature will be essentially compensated by a corresponding increment in the resistance of diode $D_1$.

In the illustrated condition of the system, photodiode $FD_1$ is illuminated so that transistor $Q_1$ conducts and cuts off the transistor $Q_2$. Condenser C is thereby charged substantially to ground potential at the base of transistor $Q_3$ which is therefore also substantially nonconductive; the resulting high-positive potential at the base of the transistor $Q_4$ renders this transistor conductive whereby relay RL is operated, attracting its armatures. Lamp L is therefore extinguished and the shunt circuit across resistor $R_7$ is broken so that the emitter potential of transistor $Q_4$ is relatively low; this means that a minor decrease in the illumination of photodiode $FD_1$ will not reduce the current flow through transistor $Q_4$ sufficiently to release the relay RL. Even a more intense change in ambient luminosity, if of short duration, will not deactivate the relay in view of the charge on condenser C.

If, however, the light impinging on photodiode $FD_1$ becomes so weak that transistor $Q_1$ substantially ceases to conduct, transistor $Q_2$ is activated along with transistor $Q_3$. The resulting lowering of the base voltage of transistor $Q_4$ deenergizes the relay RL so that lamp L lights and the connection between resistors $R_3$ and $R_4$ is closed; at the same time the emitter potential of transistor $Q_4$ is raised so that the latter transistor can be reactivated only by a considerably higher base potential than previously needed to hold the relay RL. Thus, I have provided a latching or toggle effect which stabilizes the system against untimely reversals in response to relatively minor and/or brief changes in lighting conditions.

Potentiometer R serves for the manual adjustment of the response threshold of the system with relay RL either operated or unoperated.

Lamp L is representative of any light source controlled in response to ambient luminosity, e.g., the courtesy lights of a parked automotive vehicle.

I claim:

1. A circuit arrangement for detecting incident radiation, comprising a source of direct current; a resistance bridge having an input diagonal connected across said source and further having an output diagonal with a minor fraction of the source voltage developed thereacross; a first and a second transistor of opposite conductivity types each with a base, an emitter and a collector, said transistors having their base/emitter circuits connected in bucking relationship in said output diagonal between a first terminal feeding the base of said first transistor and a second terminal tied to the emitter of said second transistor; a radiation-sensitive resistance element connected between the base of said first transistor and said first terminal; a resistor common to said base/emitter circuits connected in series with the emitter/collector circuit of said first transistor across said input diagonal; amplifier means having an input circuit connected across said source in series with the collector of said second transistor; and a load circuit including relay means connected to the output of said amplifier means for alternate energization and deenergization in response to variations in the level of radiation incident upon said resistance element.

2. A circuit arrangement as defined in claim 1 wherein said resistance element is a photodiode, further comprising an impedance element of substantially the same thermal coefficient of resistance as said photodiode connected in an arm of said bridge as part of a temperature-compensating circuit extending from said first terminal to the junction of said base/emitter circuits by way of said common resistor.

3. A circuit arrangement as defined in claim 2 wherein said compensating element is a germanium diode.

4. A circuit arrangement as defined in claim 1, further comprising biasing means for said amplifier means and switch means controlled by said relay means for modifying said biasing means in a sense tending to maintain the state of energization of said relay means.

5. A circuit arrangement as defined in claim 4 wherein said amplifier means comprises a third and a fourth transistor connected in cascade and provided each with a base, an emitter and a collector, said input circuit including the base and emitter of said third transistor, said biasing means including a feedback resistance in the base/emitter circuit of said fourth transistor.

6. A circuit arrangement as defined in claim 5 wherein said feedback resistance is connectable by said switch means in series with at least part of an arm of said bridge extending to said second terminal.

7. A circuit arrangement as defined in claim 5, further comprising a capacitance bridged across the base/collector circuit of said third transistor.

8. A circuit arrangement as defined in claim 5 wherein said third and fourth transistors are of the same conductivity type as said first transistor.

9. A circuit arrangement as defined in claim 1 wherein the emitter of said first transistor is connected to the base of said second transistor and to said common resistor.

10. A circuit arrangement as defined in claim 1 wherein said resistance element is sensitive to luminous radiation, said load circuit includes a lamp connected for energization by said relay means upon the reduction of ambient light below a predetermined threshold.

* * * * *